(12) United States Patent
Sano

(10) Patent No.: US 8,004,698 B2
(45) Date of Patent: Aug. 23, 2011

(54) IMAGE FORMING APPARATUS FOR COMBINING A SCANNED IMAGE WITH OTHER IMAGE DATA AND PRINTING THE COMBINED IMAGE IN BLACK AND WHITE OR COLOR BASED ON A SET MODE

(75) Inventor: Jumpei Sano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/549,705

(22) Filed: Aug. 28, 2009

(65) Prior Publication Data

US 2009/0316212 A1    Dec. 24, 2009

Related U.S. Application Data

(63) Continuation of application No. 10/953,149, filed on Sep. 28, 2004, now Pat. No. 7,599,078.

(30) Foreign Application Priority Data

Sep. 29, 2003    (JP) .................................. 2003-337977

(51) Int. Cl.
*G06F 3/12* (2006.01)
(52) U.S. Cl. ........ 358/1.13; 358/2.1; 358/450; 358/540; 358/3.28; 358/1.18
(58) Field of Classification Search .................. 358/1.9, 358/527, 1.13, 2.1, 540, 450, 3.28, 1.18, 358/518, 538; 382/167, 284; 399/183, 184, 399/193, 54, 45, 53
See application file for complete search history.

(56) References Cited

U.S. PATENT DOCUMENTS

| | | | | |
|---|---|---|---|---|
| 5,028,992 A * | 7/1991 | Arai | ............................... | 358/540 |
| 5,381,248 A * | 1/1995 | Ikeda et al. | .................... | 358/538 |
| 5,513,300 A * | 4/1996 | Shibazaki | ..................... | 358/1.13 |
| 5,815,645 A * | 9/1998 | Fredlund et al. | .............. | 358/1.18 |
| 6,538,769 B2 * | 3/2003 | Yoshida et al. | ................ | 358/1.9 |
| 7,110,137 B2 * | 9/2006 | Burgess et al. | .............. | 358/1.18 |
| 7,307,758 B2 * | 12/2007 | Moro | ............................. | 358/2.1 |
| 7,508,996 B2 * | 3/2009 | Matsumoto et al. | ........... | 382/284 |
| 7,526,135 B2 * | 4/2009 | Iinuma et al. | .................. | 382/232 |
| 2003/0098983 A1 * | 5/2003 | Terada | ............................. | 358/1.2 |
| 2003/0202138 A1 * | 10/2003 | Nakamura | ..................... | 349/113 |

\* cited by examiner

*Primary Examiner* — Twyler L Haskins
*Assistant Examiner* — Dennis Dicker
(74) *Attorney, Agent, or Firm* — Canon U.S.A. Inc., I.P. Division

(57) ABSTRACT

An image processing system includes a first obtaining section for obtaining a first image and a color mode for the first image; a second obtaining section for obtaining a second image and a color mode for the second image; a priority setting section for setting which of the color mode for the first image and the color mode for the second image priority is to be given to; a color-mode setting section for setting a color mode for a composite image based on the color mode for the first image, the color mode for the second image, and the setting of the priority setting section; a combining section for combining the first image and the second image to produce the composite image; and an outputting section for outputting the composite image with the color mode set by the color-mode setting section.

7 Claims, 13 Drawing Sheets

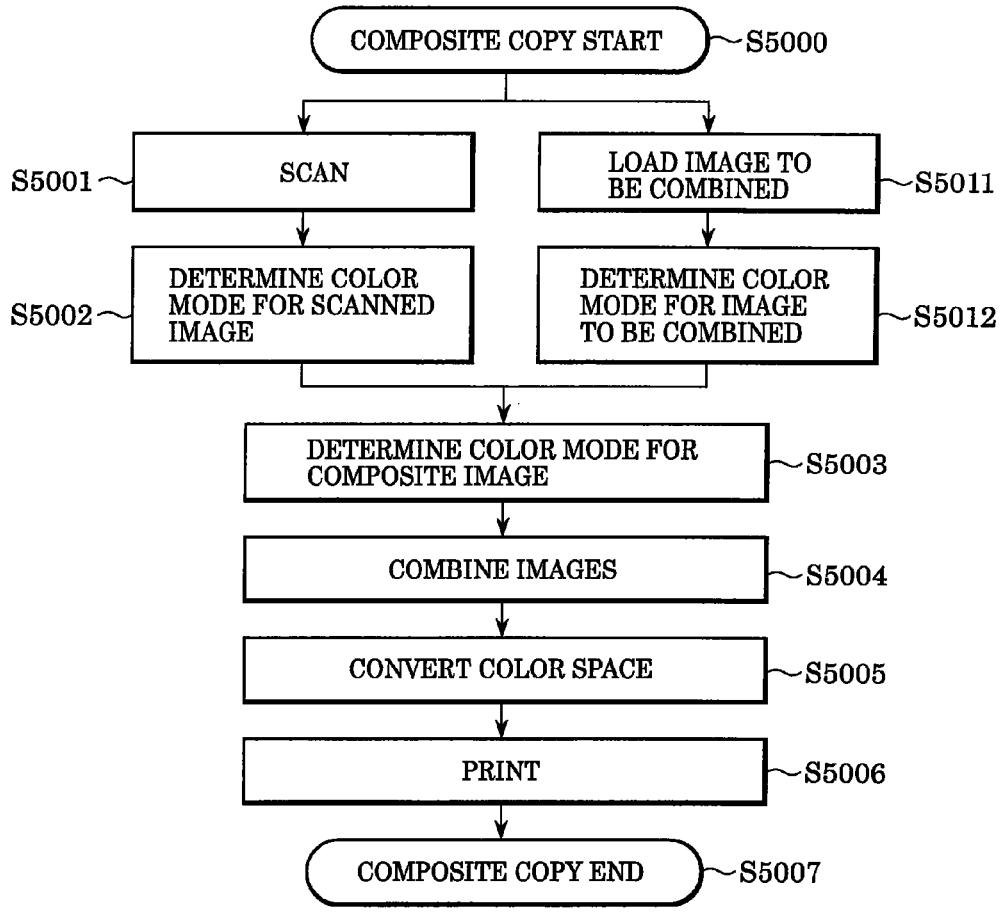

FIG. 18

|  |  | IMAGE TO BE COMBINED | | | |
|---|---|---|---|---|---|
|  |  | COLOR | B&W | ACS/COLOR DETERMINATION | ACS/B&W DETERMINATION |
| DOCUMENT IMAGE | COLOR | COLOR | COLOR | COLOR | COLOR |
|  | B&W | COLOR | B&W | COLOR | B&W |
|  | ACS/COLOR DETERMINATION | COLOR | COLOR | COLOR | COLOR |
|  | ACS/B&W DETERMINATION | COLOR | B&W | COLOR | B&W |

FIG. 19

|  |  | IMAGE TO BE COMBINED | | | |
|---|---|---|---|---|---|
|  |  | COLOR | B&W | ACS/COLOR DETERMINATION | ACS/B&W DETERMINATION |
| DOCUMENT IMAGE | COLOR | COLOR | B&W | COLOR | B&W |
|  | B&W | COLOR | B&W | COLOR | B&W |
|  | ACS/COLOR DETERMINATION | COLOR | B&W | COLOR | B&W |
|  | ACS/B&W DETERMINATION | COLOR | B&W | COLOR | B&W |

IMAGE FORMING APPARATUS FOR COMBINING A SCANNED IMAGE WITH OTHER IMAGE DATA AND PRINTING THE COMBINED IMAGE IN BLACK AND WHITE OR COLOR BASED ON A SET MODE

CROSS REFERENCE TO RELATED APPLICATIONS

This application is a continuation of U.S. patent application Ser. No. 10/953,149 filed Sep. 28, 2004 which claims priority from Japanese Patent Application No. 2003-337977 filed Sep. 29, 2003, both of which are hereby incorporated by reference herein in their entirety.

BACKGROUND OF THE INVENTION

1. Field of the Invention

The present invention relates to an image processing system and an image processing method for combining images.

2. Description of the Related Art

Various conventional image processing systems for combining images are known. As an example, a system for combining pre-registered images (e.g., watermark or background) with input images (e.g., scanned or PDL (page description language)) is known. Another example is a system for merging page numbers with the input image in the order of pages or for combining, during multiple set copying, a copy number with each set of copies.

The image processing system can also output a composite image in which a watermark image, a page number, and input image are combined and the system automatically determines whether the output image is in black-and-white or in color. With automatic color selection (ACS) as the color mode, when any color is contained in the source image, the composite image is output as a color image.

Thus, conventional image processing systems with ACS will output a color image regardless of whether the user desires a color output image so long as the watermark image, page number, copy number contains some color, even when the source image is in black-and-white. Thus, for example, where it would be less expensive to output a composite image to a printer in black-and-white, such conventional systems will typically output the composite image in color. Consequently, additional cost unintended by the user is incurred.

SUMMARY OF THE INVENTION

Accordingly, the present invention has been made to resolve the aforementioned drawbacks and disadvantages of conventional imaging systems by providing an image processing system and method configured to output composite images as intended by a user.

According to one aspect of the present invention, the image processing system of the present invention includes a first obtaining section for obtaining a first image and a color mode for the first image, a second obtaining section for obtaining a second image and a color mode for the second image, a priority setting section for setting which of the color mode for the first image and the color mode for the second image priority is to be given to. The image processing system further includes a color-mode setting section for setting a color mode for a composite image based on the color mode for the first image, the color mode for the second image, and the setting of the priority setting section. The image processing system further includes a combining section for combining the first image and second images to produce the composite image and an outputting section for outputting the composite image with the color mode set by the color-mode setting section.

Another aspect of the present invention provides an image processing method. The image processing method includes a first obtaining step of obtaining a first image and a color mode for the first image, a second obtaining step of obtaining a second image and a color mode for the second image, and a priority setting step of setting which of the color mode for the first image and the color mode for the second image priority is to be given to. The image processing method further includes a color-mode setting step of setting a color mode for a composite image based on the color mode for the first image, the color mode for the second image, and the setting set in the priority setting step. The image processing system further includes a combining step of combining the first image and the second image to produce the composite image and an outputting step of outputting the composite image with the color mode set in the color-mode setting step.

According to another aspect of the present invention, an image processing system in disclosed. Among other components, the image processing system includes a first unit that obtains a first image corresponding to a first color mode, and a second unit that similarly obtains a second image corresponding to a second color mode. A combining unit then combines the first image and the second image to produce a composite image. A priority setting unit gives priority to either the first color mode or the second color mode, and a color-mode setting unit sets the composite image for output in either the first color mode or the second color mode based on which color mode is given priority. An output unit then outputs the composite image in either the first color mode or second color mode set by the color-mode setting unit.

Further features and advantages of the present invention will become apparent from the following description of the preferred embodiments with reference to the attached drawings.

BRIEF DESCRIPTION OF THE DRAWINGS

FIG. 16 is a flow chart illustrating processing procedures for image combination performed by the image processing system according to the first embodiment of the present invention in conjunction with an example of processing for combing a scanned image and an image pre-stored in the hard disk.

FIG. 17 is a table showing color modes for a composite image when a composite-color-mode priority setting means gives priority to an input image in accordance with an embodiment of the present invention.

FIG. 18 is a table showing color modes for a composite image when the composite-color-mode priority setting means gives priority to an image to be combined in accordance with an embodiment of the present invention.

FIG. 19 is a table showing another example of color modes for a composite image when the composite-color-mode priority setting means gives priority to an image to be combined in accordance with an embodiment of the present invention.

DETAILED DESCRIPTION OF THE EMBODIMENTS

Embodiments of the present invention will now be described below in detail with reference to the attached drawings.

First Embodiment

Figure 1:
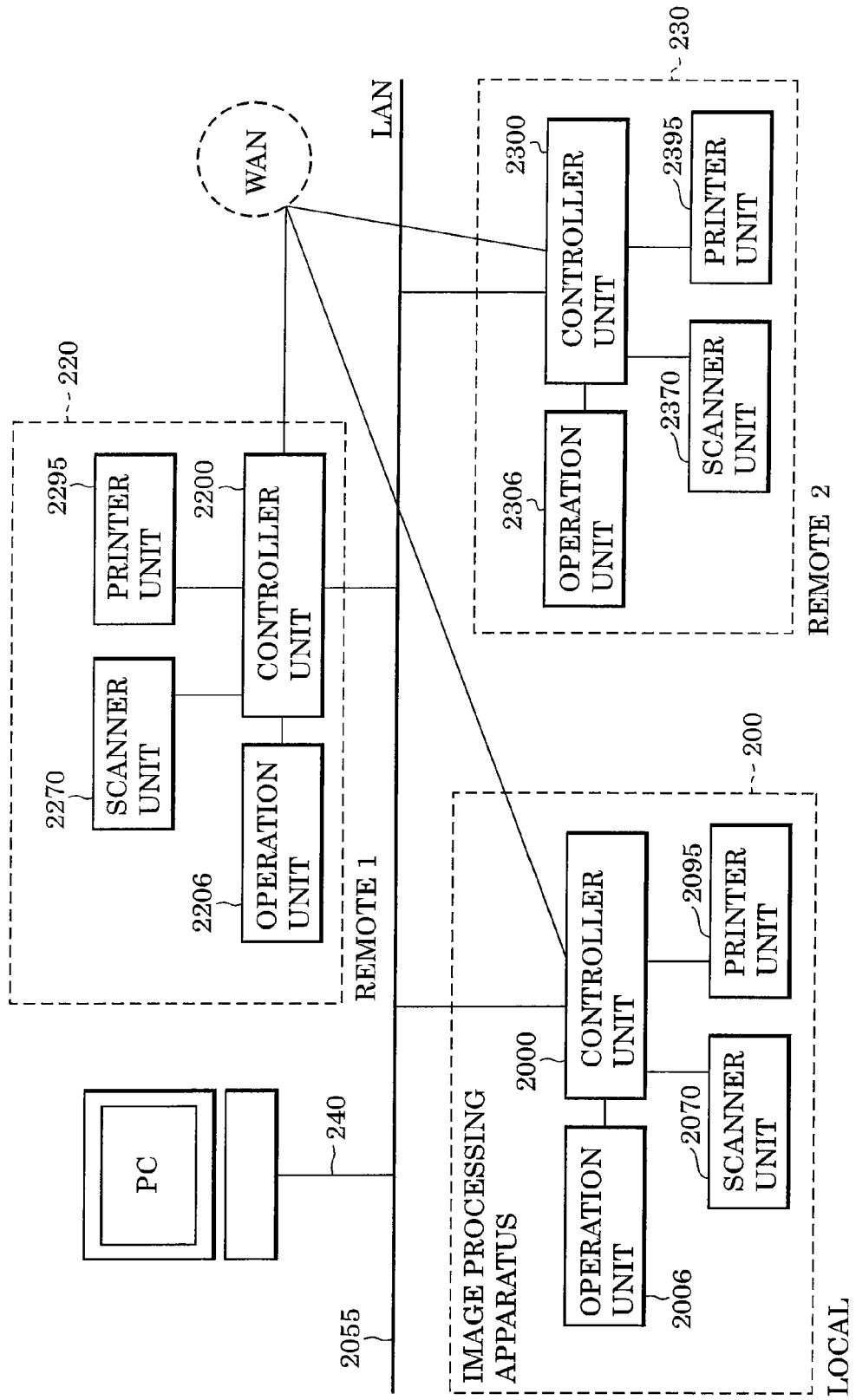
FIG. 1 is a block diagram of an image processing system in accordance with an embodiment of the present invention.

FIG. 1 is a block diagram of an image processing system according to a first embodiment of the present invention. The image processing system includes an image processing system 200 connected to other image processing systems 220 and 230, which have similar configurations to the image processing system 200, and a personal computer (PC) 240 through a LAN (local area network) 2055. The image processing system 200 can transmit and receive, for example, electronic mail and files using a FTP (File Transfer Protocol) and/or an SMB (Server Message Block) protocol.

The image processing system 200 according to this embodiment includes a controller unit 2000, a scanner unit 2070 which is an image input device, a printer unit 2095 which is an image output device, and an operation unit 2006 which is a user interface. The scanner unit 2070, the printer unit 2095, and the operation unit 2006 are connected to the controller unit 2000, which is, in turn, connected to network transmission means, such as the LAN 2055, and/or a WAN (wide area network). G3 and G4 facsimile transmission, including color-image transmission, may also be used. Similar to the image processing system 200, the image processing systems 220 and 230 include scanner units 2270 and 2370, printer units 2295 and 2395, and operation units 2206 and 2306, respectively, all of which are connected to corresponding controller units 2200 and 2300.

Figure 2:
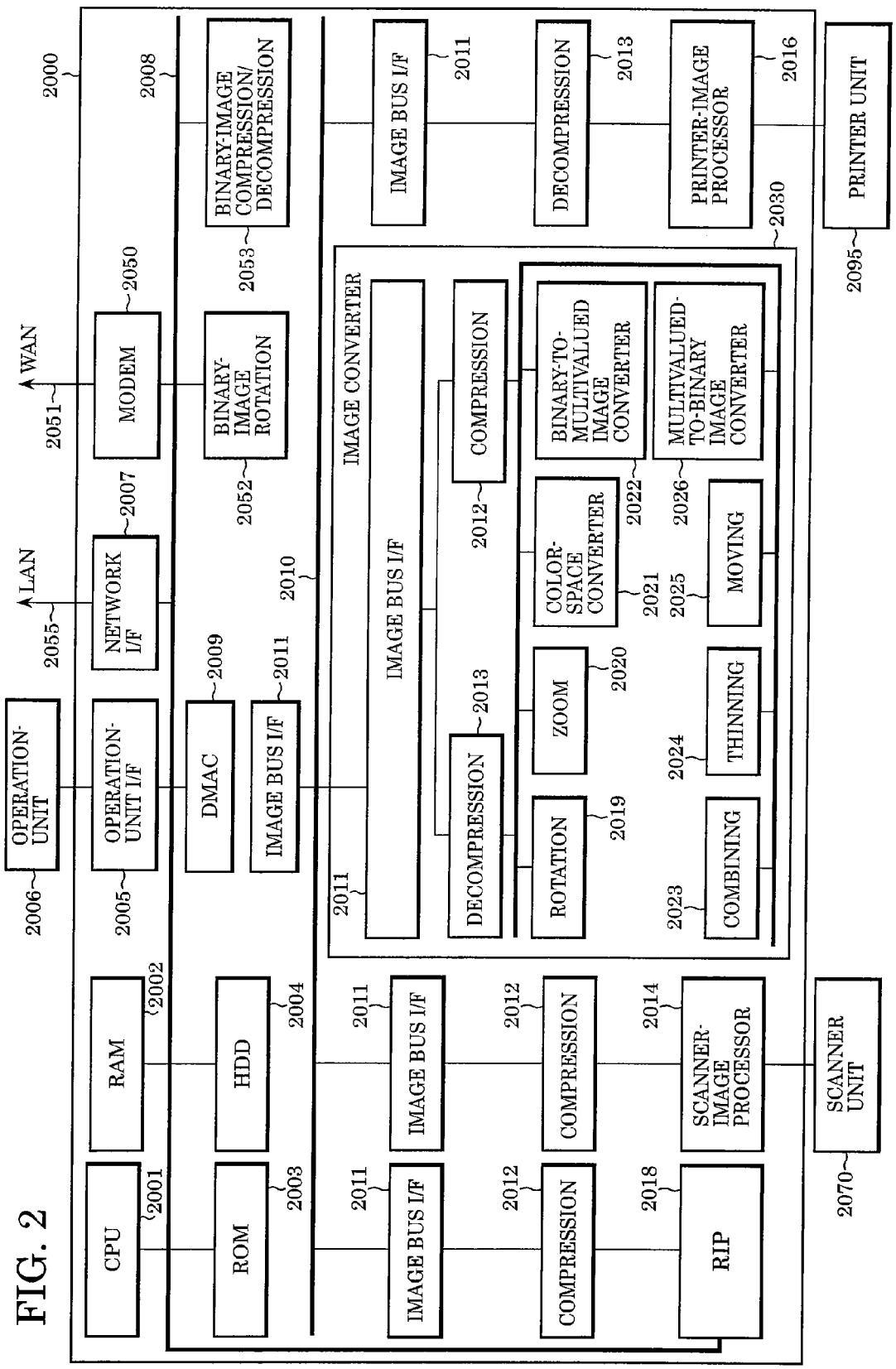
FIG. 2 is a block diagram showing details of the image processing system of FIG. 1.

FIG. 2 is a block diagram showing a detailed configuration of the image processing system 200 shown in FIG. 1. The image processing systems 220 and 230 also have similar configurations to the image processing system 200. Referring to FIG. 2, the controller unit 2000 is connected to the scanner unit 2070, which is an image input device, and the printer unit 2095, which is an image output device. The controller 2000 is also connected to the LAN 2055 and a WAN (wide area network) 2051, to function as a controller for inputting and outputting image information and device information.

A CPU (central processing unit) 2001 controls the entire system of the image processing system 200. A RAM (random access memory) 2002 functions as a system work memory for the operation of the CPU 2001 and also functions as an image memory for temporarily storing image data. A ROM (read only memory) 2003 is a boot ROM to store a boot program for the system. A hard disk drive (HDD) 2004 stores system software, image data, and so on. An operation-unit interface (I/F) 2005 is a user interface for the operation unit (UI) 2006 and outputs image data to the operation unit 2006 so that an image is displayed thereat. The operation-unit I/F 2005 also functions to send information, entered by a user of the system through the operation unit 2006, to the CPU 2001.

A network I/F 2007 is connected to the LAN 2055 to input and output information. A modem 2050 is connected to the WAN 2051 to input and output image information. Before the modem 2050 transmits a binary image, a binary-image rotation section 2052 and a binary-image compression/decompression section 2053 change the orientation of the image and convert the resolution thereof into a predetermined resolution or a resolution suitable for an image receiving system. The compression and decompression support, for example, JBIG, MMR, MR, and MH standards.

A direct memory access controller (DMAC) 2009 reads an image stored in the RAM 2002 without the use of the CPU 2001 and transfers the read image to an image bus I/F 2011. Alternatively, the DMAC 2009 writes an image, sent from the image bus I/F 2011, to the RAM 2002 without the use of the CPU 2001. The devices described above, i.e., the CPU 2001, the RAM 2002, the operation-unit I/F 2005, the network I/F 2007, the modem 2050, the binary-image rotation section 2052, the binary-image compression/decompression section 2053, and the DMAC 2009 are connected to a system bus 2008.

The image bus I/F 2011 also controls input/output of high-speed images sent through an image bus 2010. Before an image is sent through the image bus 2010, a compression section 2012 compresses the image into a JPEG image with a 32 pixels×32 pixels. A decompression section 2013 decompresses the image upon receipt from the image bus 2010.

A raster image processor (RIP) 2018 receives page description language (PDL) code from a host computer through the network I/F 2007 and the CPU 2001 stores the PDL code in the RAM 2002 through the system bus 2008. The CPU 2001 converts the PDL into intermediate code and sends the intermediate code to the RIP 2018 through the system bus 2008 again, so that the intermediate code is decompressed into a bitmap image (i.e., a multivalued image).

A scanner-image processor 2014 performs appropriate image processing (e.g., correcting, modifying, and editing) on color or black-and-white images received from the scanner unit 2070 and outputs multivalued image data. Similarly, a printer-image processor 2016 performs appropriate image processing (e.g., correcting, modifying, editing) for the printer unit 2095. During printing, the decompression section 2013 performs binary-to-multivalue conversion, so that the printer-image processor 2016 can output binary image data or multivalued image data to the printer unit 2095.

An image converter 2030 performs image-conversion on an image stored in the RAM 2002 and has various image-conversion functions used for writing an image back to the RAM 2002. A rotation section 2019 in the image converter 2030 can rotate an image with 32 pixels×32 pixels by a specified angle and can process both a binary input/output and a multivalued input/output. A zoom section 2020 has a conversion function for converting the resolution of an image (e.g., from 600 dpi into 200 dpi) and a zoom function for zooming an image (e.g., from 25% to 400%). Before zooming, the zoom section 2020 rearranges a 32×32 pixel image into a 32 line image.

Based on an input multivalued image, a color-space converter 2021 uses, for example, a matrix operation and a lookup table (LUT) to convert a YUV image, stored in the memory, into a Lab image. The color-space converter 2021 can use of a 3×8 matrix operation and a one-dimensional LUT to perform known processing for removing ground-color and processing for preventing show-through. The color-space converter 2021 outputs a converted image in multi values.

A binary-to-multivalued image converter 2022 converts a 1-bit binary image into a multivalued image, for example, into an 8-bit image with 256 grayscales. Conversely, a multivalued-to-binary image converter 2026 converts an 8-bit, 256-grayscale image in the memory into a 1-bit, 2-grayscale image by a technique, such as error diffusion processing, and stores the 1-bit image in the memory. A combining section 2023 functions to combine two multivalued images in the memory into one multivalued image. For example, the combining section 2023 can combine a company-logo image, which is in the memory, with a document image to thereby readily attach a company logo to the document image.

A thinning section 2024 converts the resolution of an image by thinning-out pixels of a multivalued image, and can output, for example, a ½, ¼, or ⅛ multivalued image. The thinning section 2024 and the zoom section 2020 in combination can perform a wider variety of enlargement/reduction processing. A moving section 2025 adds a margin portion to an input binary image or multivalued image or deletes a margin portion from an input binary image or multivalued image and outputs the resulting image. The rotation section 2019, the zoom section 2020, the color-space converter 2021, and the binary-to-multivalued image converter 2022 can interoperate with each other. Further, they can also operate with the combining section 2023, the thinning section 2024, the moving section 2025, and the multivalued-to-binary image converter 2026. For example, without the use of the CPU 2001, those sections can cooperate with each other to rotate a multivalued image in the memory and converts the resolution of the image.

Figure 3:
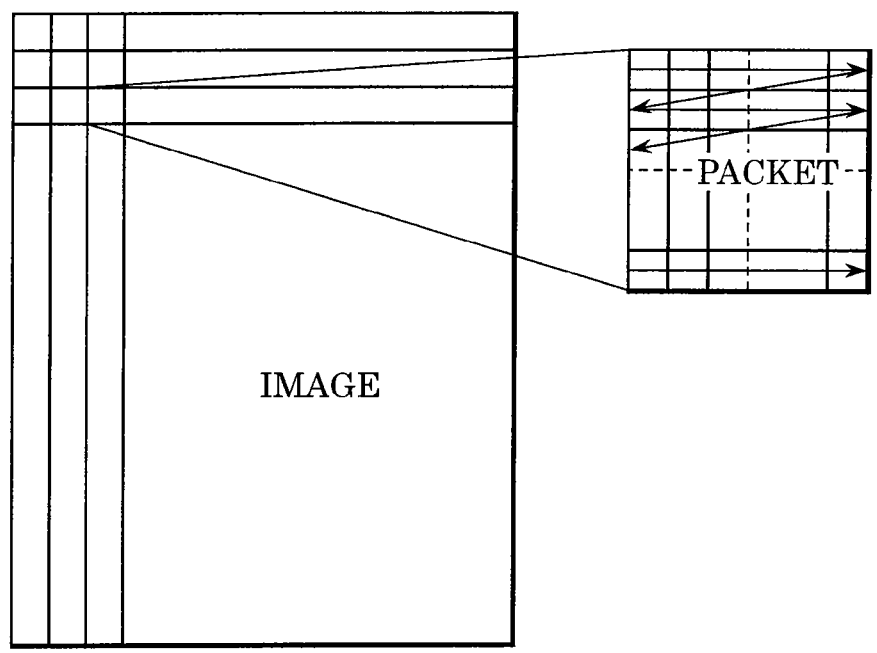
FIG. 3 illustrates the format of an image.

FIG. 3 is a schematic view illustrating an image format for use in the first embodiment. An image format for use in the first embodiment utilizes an image packet structure disclosed in, for example, Japanese Patent Laid-Open No. 2001-103473. The compression section 2012 rearranges a raster-format image into packets with 32×32 pixels as shown in FIG. 3 and performs JPEG compression thereon for each packet.

Figure 4:
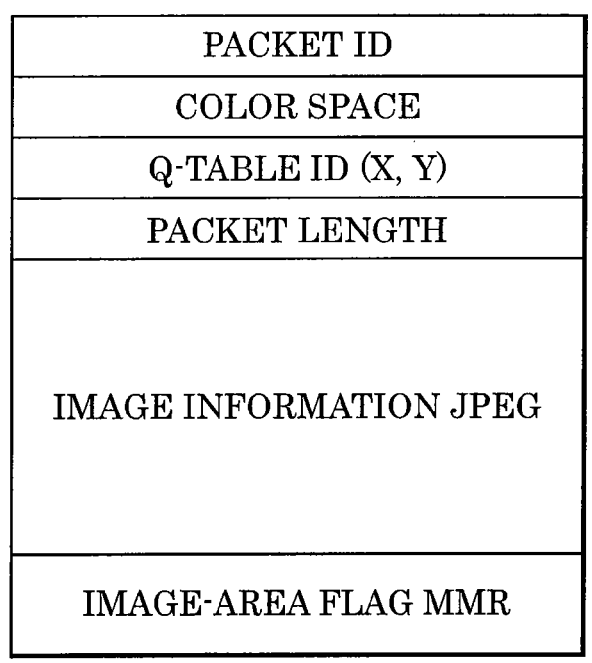
FIG. 4 illustrates the structure of packet data.

FIG. 4 is a schematic view illustrating the structure of a data packet for use with the first embodiment of the present invention. During JPEG compression, the compression section 2012 of FIG. 4 provides header information by attaching information to the header packet. Such information can be an ID (identifier) indicating a packet position, a color space, a Q-table ID, and a data length, to the packet, to provide header information. In addition, the compression section 2012 (FIG. 2) similarly compresses binary data (i.e., an image area flag) indicating a character or a photo and attaches the compressed data to the end of the JPEG information.

In contrast, the decompression section 2013 decompresses JPEG information based on the header information and rearranges the decompressed information into a raster image. With such a packet image, rotating only an image and changing the position of the packet ID allows image processing efficiency to be improved. All images flowing through the image bus 2010 are converted into packet images. When a raster image is required for facsimile transmission or for the binary-image rotation section 2052 or the binary-image compression/decompression section 2053, software is used to convert a packet image into the raster image.

Figure 5:
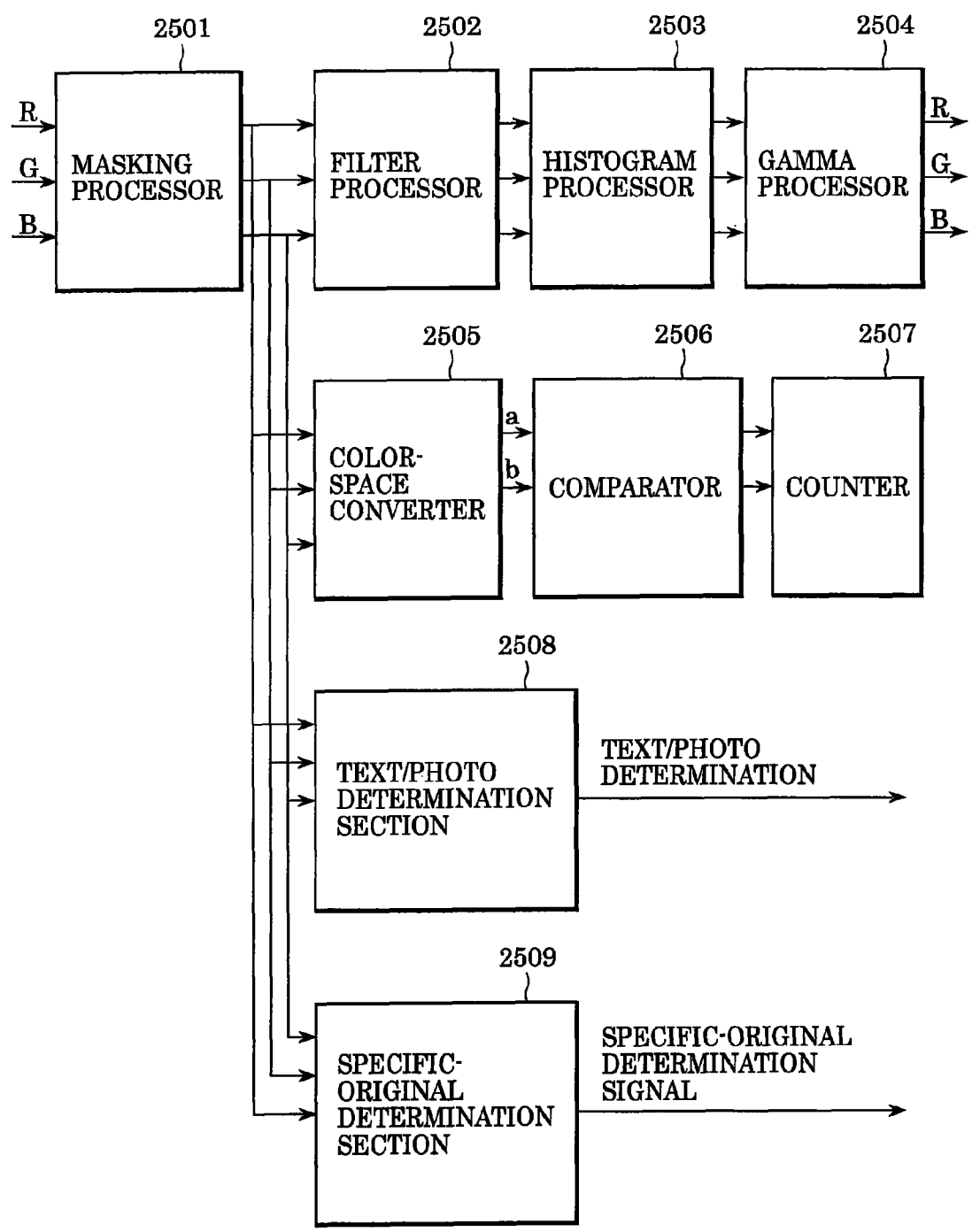
FIG. 5 is a block diagram showing details of a scanner-image processor in the image processing system of FIG. 1.

FIG. 5 is a block diagram showing details of the scanner-image processor 2014 of the image processing system 200 according to the first embodiment. Eight-bit brightness signals (for the respective R, G, and B) input from the scanner unit 2070 are converted by a masking processor 2501 into standard RGB signals that are independent of a CCD filter color. A filter processor 2502 uses, for example, a 9×9 matrix to perform processing for blurring or accentuating an image.

A histogram processor 2503 samples image-signal data of an input image, and uses the data to determine the ground-color level of the input image. The histogram processor 2503 creates a histogram by sampling RGB data in a rectangular area. Around the rectangular area are start and end points, which are at a constant pitch in the main-scanning and sub-scanning directions. When a ground-color removal function or a show-through protection function is specified, the histogram is read to estimate the ground color of a document. The histogram is stored and is managed, together with an image, in the memory and/or on the HDD as a ground-color removal level, and is used for image processing during print or transmission. A gamma processor 2504 performs processing for increasing or reducing the density of an entire image. For example, the gamma processor 2504 converts the color space of an input image into an arbitrary color space and/or performs correction processing for color of an input image.

A color-space converter 2505 converts a pre-zoomed-image signal into a known Lab-image signal in order to determine whether the original is color or black-and-white (B&W). When color-signal components a and b are at a predetermined or higher level defined by a comparator 2506, the original is determined to be chromatic. Otherwise, the original is determined to be achromatic color, and the comparator 2506 outputs a 1-bit determination signal. A counter 2507 then measures the output from the comparator 2506. A text/photo determination section 2508 has functions for extracting a character edge from the input image and separating the image into characters and a picture, after which a text/photo determination signal is output. This signal is stored in the memory and/or on the HDD together with the image and is used for printing.

A specific-original determination section 2509 compares the pattern of the input image signal and a signal held in the specific-original determination section 2509 and outputs a match or unmatched determination result. This is useful in, for example, preventing counterfeiting of banknotes and stocks/bonds.

Figure 6:
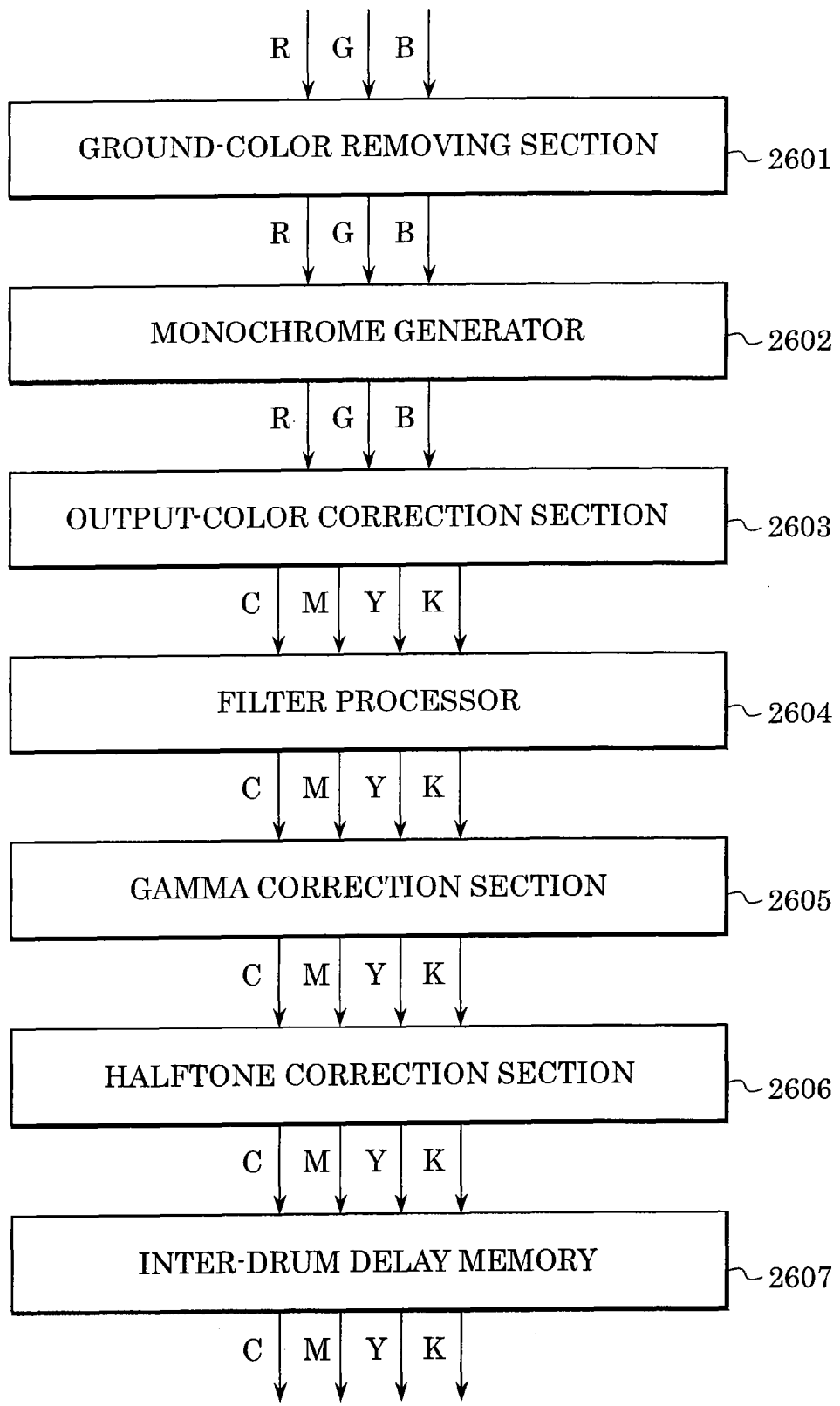
FIG. 6 is a block diagram of a printer-image processor in the image processing system of FIG. 1.

FIG. 6 is a block diagram showing input and output signal flow through the printer-image processor 2016 of the image processing system 200 in accordance with the first embodiment. A ground-color removing section 2601 uses an LUT or a 3×8 matrix operation to remove the ground color of image data, which removes unwanted fog. A monochrome generator 2602 has a function for converting color-image data into monochrome-image data. When image is printed in monochrome, the monochrome generator 2602 converts, for example, RGB data into gray-monochrome data. For example, the ground-color removing section 2601 can perform a 1×3 matrix operation for multiplying a predetermined constant signal with RGB to provide a gray signal.

An output-color correction section 2603 has a function for correcting color based on characteristics of the printer unit 2095 to which image data is output. For example, the output-color correction section 2603 performs processing using a 4×8 matrix operation and direct mapping. A filter processor 2604 has a function for arbitrarily correcting the spatial frequency of image data and for performing 9×9 matrix operations. A gamma correction section 2605 has a function for performing gamma correction based on characteristics of the printer unit 2095. The gamma correction section 2605 also typically performs processing using a one-dimensional lookup table (LUT).

A halftone correction section 2606 has a function for performing halftone processing based on the number of gradations of the printing unit 2095. The halftone correction section 2606 can also perform error diffusion as well as screen processing, such as conversion into 1 bit or 32 bits. For a color printer having four drums for respective C, M, Y, and K colors, an inter-drum delay memory 2607 functions as a memory for superimposing C, M, Y, and K images by shifting C, M, Y, and K print timings by an amount corresponding to the pitch of the drums. This allows a color printer having four CMYK drums to delay timing for matching the positions of images.

Figure 7:
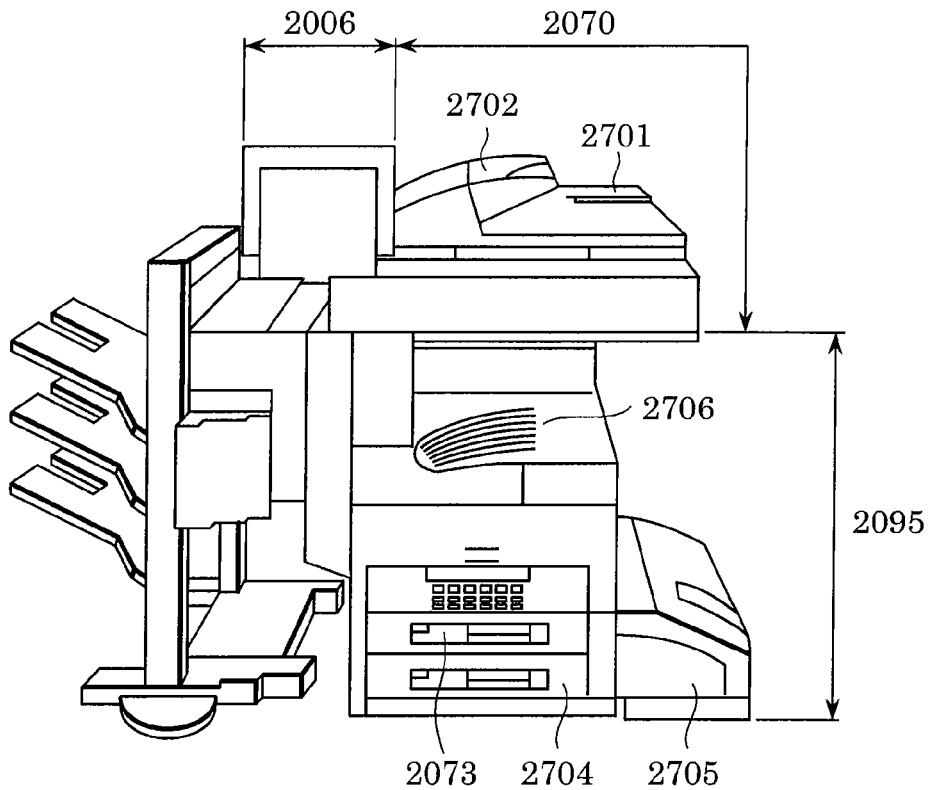
FIG. 7 is an external view of an image input/output system that implements the image processing system of FIG. 1.

FIG. 7 is an external view of an image input/output system that implements the image processing system 200 according to the first embodiment. The scanner unit 2070, which is an image input device, scans an image on a document and converts the scanned image into an electrical signal that provides raster image data. A user places a document on a tray 2702 of a document feeder 2701 and uses the operation unit 2006 to initiate scanning. In response, the CPU 2001 issues an instruction to the scanner unit 2070 so that the document is fed sheet by sheet from the tray 2702 of the document feeder 2701 and document images are scanned.

The printer unit 2095, which is an image device, converts raster image data into an image on paper. Any image forming system may be used therefor. Examples include an electrophotographic system that uses a photosensitive drum or belt and an inkjet system that directly print an image on paper by ejecting ink from an array of micro-nozzles. The printing is started in response to an instruction from the CPU 2001. The printer unit 2095 has a plurality of paper-feed stages so as to allow the user to select paper of different sizes and/or different orientations, and also has, for example, paper cassettes 2703, 2704, and 2705 corresponding to the stages. A paper output tray 2706 receives the printed document upon exit from the printer.

Figure 8:
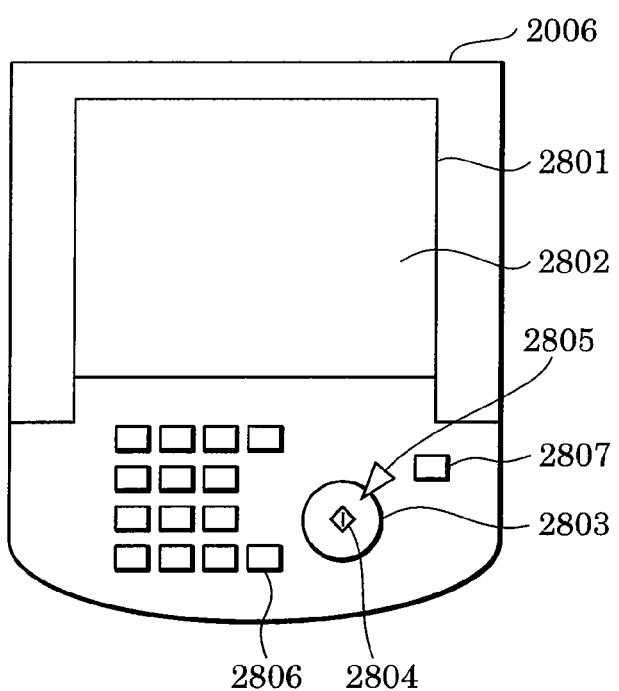
FIG. 8 is an external view of an operation unit of the image processing system of FIG. 1.

FIG. 8 is an external view of the operation unit 2006 of the image processing system 200 according to the first embodiment. As shown in FIG. 8, the operation unit 2006 has a liquid crystal display (LCD) section 2801, to which a touch panel sheet 2802 is attached to a display screen and soft keys for operating the system. When a key is pressed, the position information of the key is sent to the CPU 2001. A start key 2803 is used to start scanning of a document image. Located at the center of the start key 2803 is a two-color (green and red) LED 2804, the color of which indicates whether the start key 2803 is operable. A stop key 2805 is used to stop an operation in progress. An ID key 2806 is used to enter the ID of a user. A reset key 2807 is used for reset operations.

Figure 9:
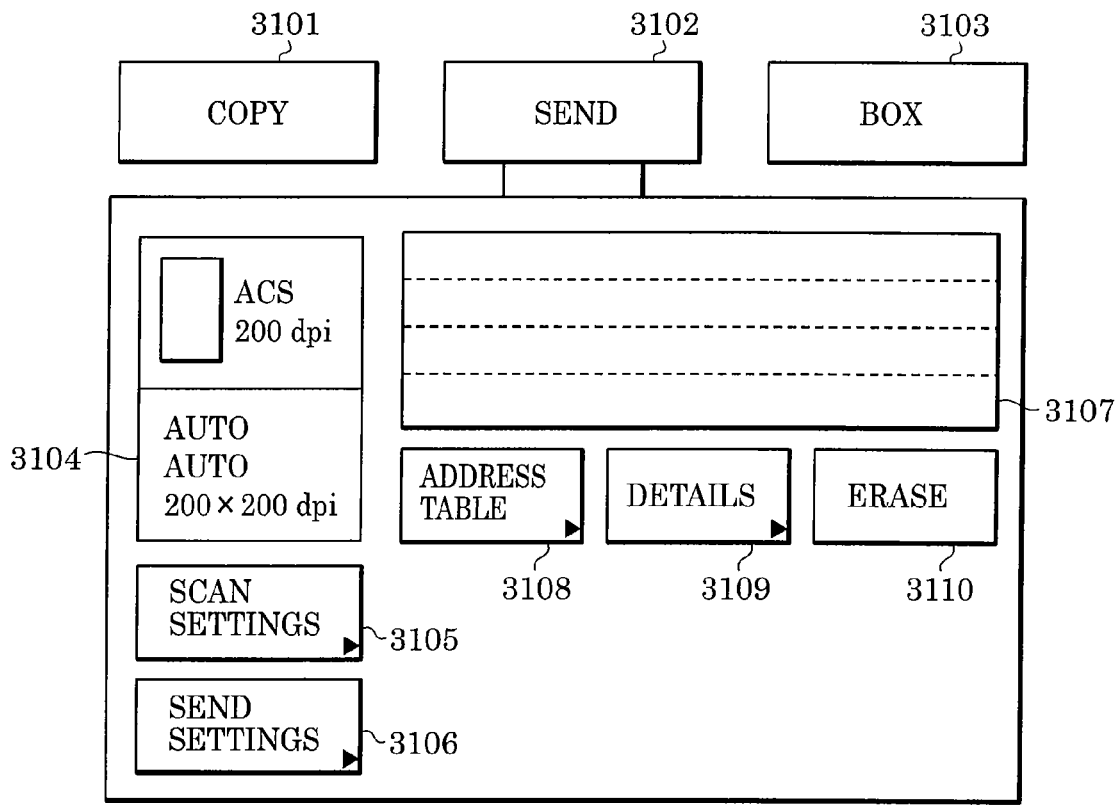
FIG. 9 shows an initial screen displayed on the operation unit 2006 of the image processing system in accordance with an embodiment of the present invention.

FIG. 9 shows an initial screen displayed on the operation unit 2006 of the image processing system 200 according to the first embodiment. The screen shown in FIG. 9 is also a main screen, which is restored after image-processing functions are set. In FIG. 9, a copy tab 3101 is used to switch to a copy setting screen. A send tab 3102 is used to provide a screen for selecting a transmission method for the scanned image. The transmission method may be facsimile, electronic mail, and the like. A box tab 3103 is used to switch to a screen with which the user can perform setting for an operation for storing a scanned image or PDL image onto the built-in HDD, printing the scanned image or PDL image stored thereon, transmitting the image, or editing the image.

A scan-setting button 3105 is used to display settings, such as a resolution and density, for scanning an image. A window 3104 displays the settings set through the scan-setting button 3105. A send-setting button 3106 is used to perform setting, for example, for setting a timer during timer transmission, for storing information on the HDD, and for printing an image. A display area 3107 displays a transmission destination specified using an address-table button 3108. A detailed-information button 3109 is used to display detailed information of a destination displayed in the display area 3107. An erase button 3110 is used to erase a destination displayed in the display area 3107.

Figure 10:
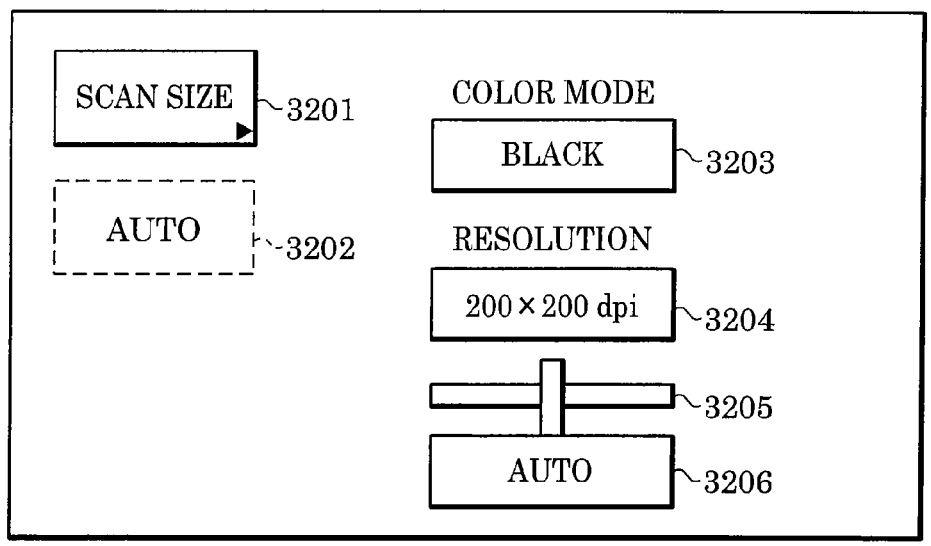
FIG. 10 shows a popup window displayed when a scan-setting button shown 3105 in FIG. 9 is pressed in accordance with an embodiment of the present invention.

FIG. 10 shows a popup window displayed when the scan-setting button 3105 shown in FIG. 9 is pressed. In FIG. 10, a scan-size button 3201 is used to select and specify a scanning paper-size. An area 3202 displays the specified scan size. A button 3203 is used to select a document-scanning mode. By depressing the button 3203, the user can select one of three scanning modes: color, black (i.e., black and white), and ACS (automatic color section). The color mode can also be selected through the above-noted copy tab and box tab. With an automatic scanning mode being selected, when the counter 2507 indicates a value smaller than a predetermined value, the document is determined to be a black-and-white document, otherwise, the document is determined to be a color document, and the result is accumulated. When a color scanning mode is selected, a color image is accumulated, and when a black scanning mode is selected, a black-and-white image is accumulated.

A button 3204 is used to enter a scanning resolution. A slider 3205 is used to adjust the scanning density for a document and it allows for adjustment in nine steps. A button 3206 is used for automatic determination of the density when a fogged-ground image, such as a newspaper image, is scanned. For copying, the button 3206 can be configured in the same manner.

Figure 11:
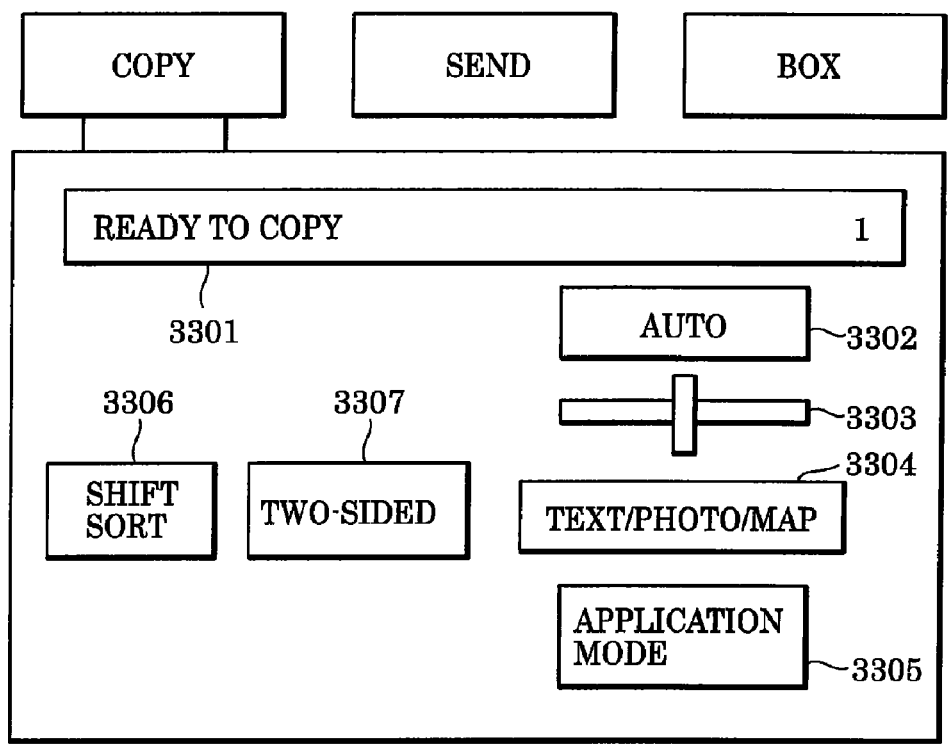
FIG. 11 shows a screen displayed when a copy tab 3101 is pressed in accordance with an embodiment of the present invention.

FIG. 11 shows a screen displayed when the copy tab 3101 is pressed. In FIG. 11, an area 3301 indicates when the system is ready for copying. It also displays the number of copies. A button 3302 has a similar function to the button 3206 and is used to turn on or off a function for automatically removing ground color. A slider 3303 has a similar function to the slider 3205 to adjust the density in, for example, nine steps.

A text/photo/map button 3304 is used to select a document type, such as text, a photo, a map, a photographic picture, or a printed picture. An application-mode button 3305 is used to set a size-reduction layout (i.e., a function for printing a reduced image of multiple documents on one sheet of paper), a color balance (i.e., fine adjustment for each of C, M, Y, and K), and so on. A shift/sort button 3306 is used to set functions regarding various types of finishing, such as shift sort, staple sort, and group sort. A button 3307 is used to perform setting regarding two-sided scanning and two-sided printing.

Figure 12:
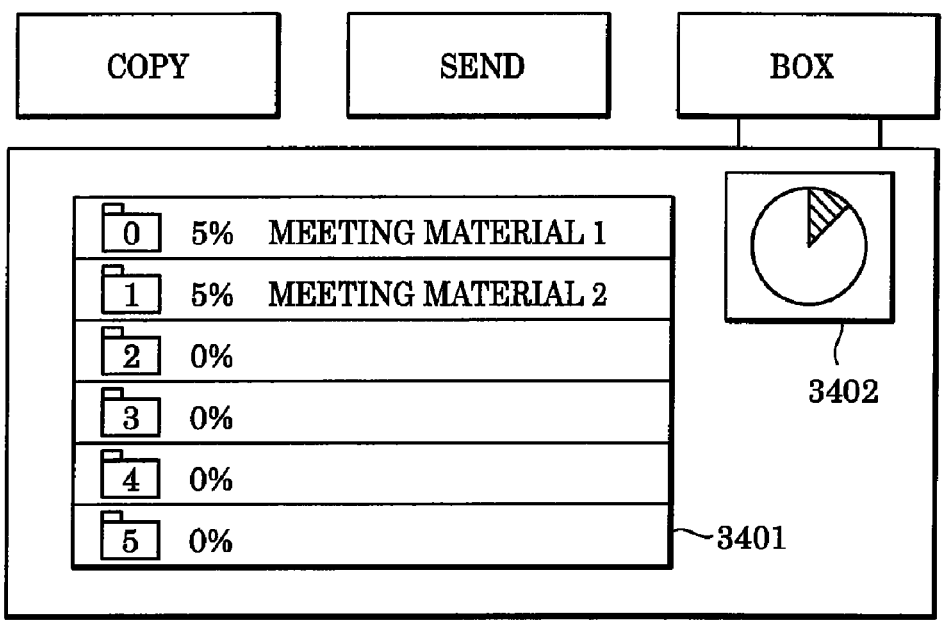
FIG. 12 shows one example of a screen displayed when a box tab 3103 shown in FIG. 9 is pressed in accordance with an embodiment of the present invention.

FIG. 12 shows one example of a screen displayed when the box tab 3103 shown in FIG. 9 is pressed. In FIG. 12, an area 3401 displays a folder area, which contains logically-divided regions of the HDD. Folder numbers are pre-assigned to the respective folders and the first field from the top indicates a folder 0. The ratios of disk capacity used by the folders are indicated at the sides of the respective folder numbers. Further, arbitrary names, which are displayed in the area 3401 can be given to folders. An area 3402 represents the amount of space used out of the entire HDD. Such a representation may be realized with a graphic representation as shown in FIG. 12, numeric values, or the like.

Figure 13:
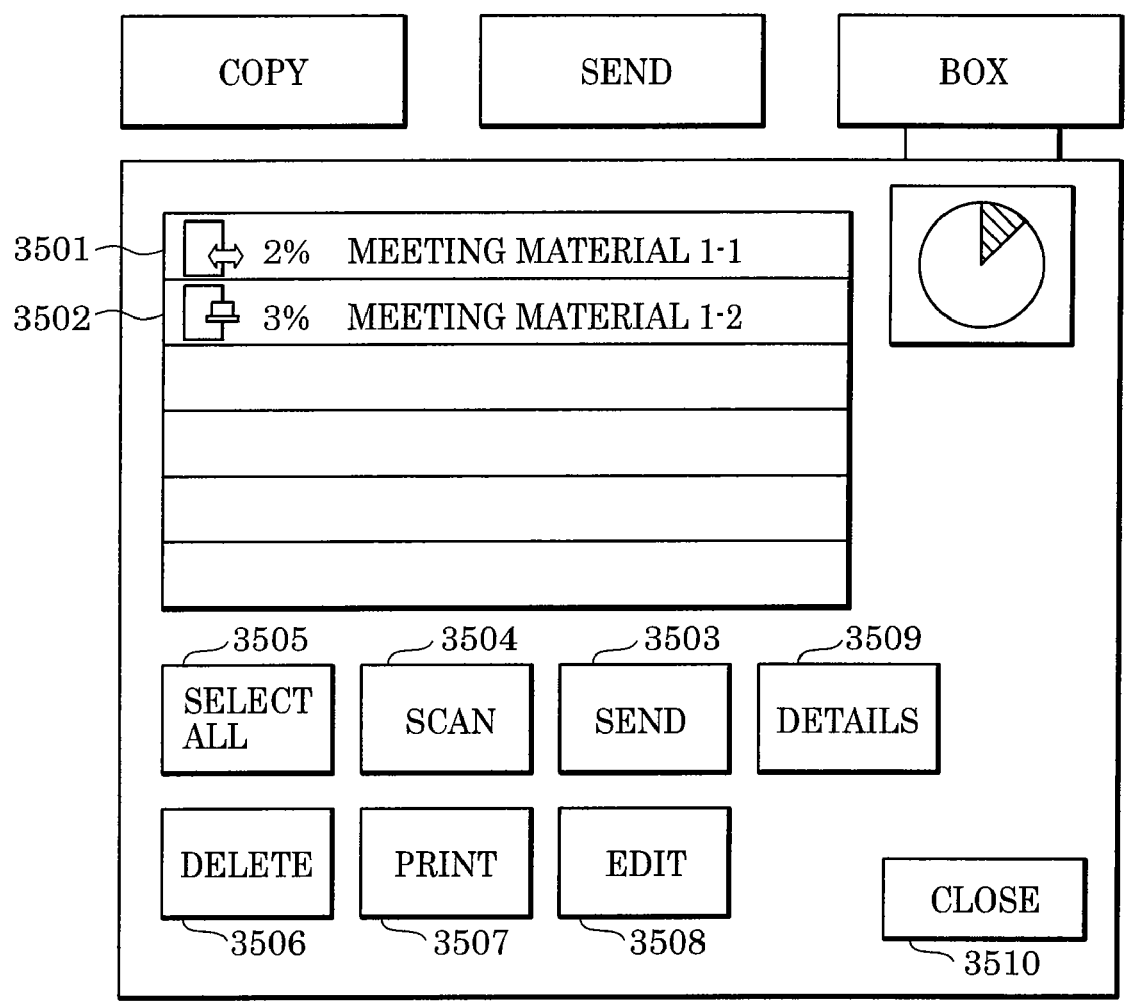
FIG. 13 shows one example of a screen displayed when a folder 0 in a folder area 3401 shown in FIG. 12 is pressed in accordance with an embodiment of the present invention.

FIG. 13 shows one example of a screen displayed when the folder 0 in the folder area 3401 shown in FIG. 12 is pressed. As shown in FIG. 13, documents 3501 and 3502 are stored in the folder 0. Each of the documents 3501 and 3502 contains a plurality of pages. The document 3501 is a scanned document, and thus an icon indicating a scanned document, the amount of HDD space used, and a document name that the user can arbitrarily set are displayed. For the document 3502, an icon indicating a PDL document (i.e., an icon that is different from the icon indicating the scanned document), which is converted from PDL and stored, is displayed. Pressing these icons causes the selection of the documents to be displayed, for example, in reverse video.

A send button 3503 is used to send a selected document. A scan button 3504 is used to scan an original from the scanner for creating a document. A select-all button 3505 is used to select all documents in a folder. A delete button 3506 is used to delete a selected document. A print button 3507 is used to print a selected document.

An edit button 3508 is used to edit a selected document. That is, by depressing the edit button 3508, for example, the user can select two documents, combine the documents into one document, and store the resulting document. Alternatively, the user can delete a particular page. A detailed-information button 3509 is used to display detailed information of a document currently selected. Pressing the detailed-information button 3509 displays information, such as a resolution, document size, and color, in addition to a document name.

Figure 14:
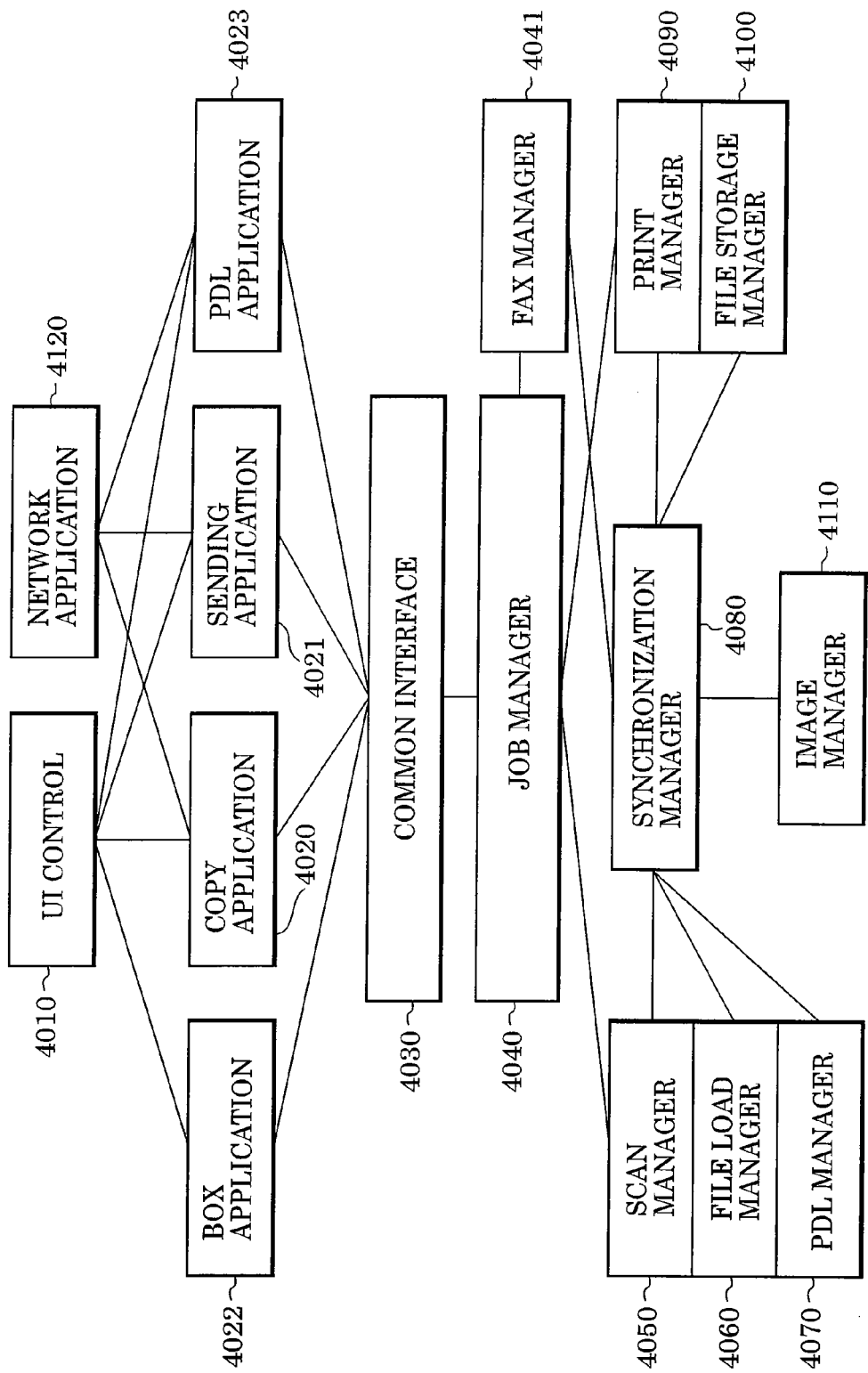
FIG. 14 is a block diagram of the configuration of software for the image processing system in accordance with an embodiment of the present invention.

FIG. 14 is a block diagram showing an exemplary configuration for image processing system software according to the first embodiment of the present invention. In FIG. 14, a user-interface (UI) control section 4010 controls the display control section. In response to an instruction from the UI control section 4010, a copy application section 4020 performs a copy operation, a sending application section 4021 performs a sending operation, and a box application section 4022 executes scanning and printing through the box screen. A PDL application section 4023 submits a PDL print job in response to PDL print data from a network application section 4120.

A common interface 4030 functions to reduce the load of hardware-dependency of the hardware control section. A job manager 4040 organizes job information received from the common interface 4030 and sends the information to downstream document processing sections.

For local copying of document, a scan manager 4050 and a print manager 4090 function as a processing section. For remote-copy scan jobs or transmission jobs, the scan manager 4050 and a file storage manager 4100 function as the processing section. For remote-copy reception jobs, a file load manager 4060 and the print manager 4090 function as the processing section. And for printing of PDL such as LISP or PostScript, a PDL manager 4070 and the printer manager 4090 function as the processing section.

The document managers use a synchronization manager 4080 to synchronize with each other to issue an image-processing request to an image manager 4110, which performs various types of image processing. During scanning or printing, the image manager 4110 performs image processing and stores an image file.

Procedures for the above-noted document processing performed at the image processing system of the present embodiment will now be further described in detail.

First, software processing for local copying will be described.

Initially, upon receipt of an instruction from the user, the UI control section 4010 sends a copy instruction and a copy setting to the copy application section 4020. In response to the information from the UI control section 4010, the copy application section 4020 transfers the information to the job manager 4040, which controls the system, via the common interface 4030. The job manager 4040 sends job information to the scan manager 4050 and the print manager 4090.

Subsequently, the scan manager 4050 issues a scan request to the scanner unit 2070 via one of device I/Fs (not shown), which are serial interfaces for providing a connection between the controller unit 2000 and the scanner unit 2070 and a connection between the controller unit 2000 and the printer unit 2095. Then, the scan manger 4050 issues an image-processing request for scanning to the image manager 4110 via the synchronization manager 4080. In accordance with the request from the scan manager 4050, the image manager 4110 performs setting for the scanner-image processor 2014. After completing the setting, the image manager 4110 sends a scan-preparation completion notification via the synchronization manager 4080. Thereafter, the scan manager 4050 issues an instruction for scanning to the scanner unit 2070.

An image-scan transfer completion notification is sent to the image manager 4110 via an interrupt signal from hardware (not shown). In response to the scan completion notification from the image manager 4110, the synchronization manager 4080 transfers the scan completion notification to both the scan manager 4050 and the print manager 4090. In order to convert a compressed image, stored in the RAM 2002, into a file on the HDD 2004, the synchronization manager 4080 issues an instruction to the image manager 4110. In response, the image manager 4110 retrieves a corresponding image from the memory and stores the image on the HDD 2004. The image manager 4110 also stores a text/photo determination signal on the HDD 2004. Further, the image manager 4110 stores information associated with the image in an SRAM (not shown). The associated information includes a color/B&W determination result, a ground-color removal level used for removing ground color, a scanned image as an input source image, and an RGB color space.

Upon receiving a scan completion notice from the scanner unit 2070 after the completion of the storage onto the HDD 2004, the image manager 4110 indicates through the synchronization manager 4080 that file conversion is complete. The scan manager 4050 then returns a completion notification to the job manager 4040, which in turn, transfers the completion notification to the copy application section 4020 via the common interface 4030.

The print manager 4090 issues a print request to the printer unit 2095 via the device I/F, when an image is input to the memory. Then, the print manager 4090 issues a print-image processing request to the synchronization manager 4080. The synchronization manager 4080 then issues a setting request for image processing to the image manager 4110. In accordance with the above-described associated information, the image manager 4110 performs setting for the printer-image processor 2016 and sends a print-preparation completion notification to the print manager 4090 via the synchronization manager 4080. The printer manager 4090 then issues a print instruction to the printer unit 2095.

A print-image transfer completion notification is then sent to the image manager 4110 via an interrupt signal from the hardware (not shown). In response to the print completion notification from the image manager 4110, the synchronization manager 4080 transfers the print completion notification to the print manager 4090. In response to a paper-discharge completion notification from the printer unit 2095, the print manager 4090 returns a completion notification to the job manager 4040. In turn, the job manager 4040 transfers the completion notification to the copy application section 4020 via the common interface 4030. After scanning and printing are completed, the copy application section 4020 issues a job-completion notification to the UI control section 4010.

Next, software processing for remote-copy scan jobs and transmission jobs is described.

First, the file storage manager 4100 (as opposed to print manager 4090) receives a request from the job manager 4040. After a scanned image is stored on the HDD 2004, the job manager 4040 receives a storage-completion notification from the synchronization manager 4080. Via the common interface 4030, the job manager 4040 transfers the notification to the copy application section 4020 for remote copying and transfers the notification to the sending application section 4021 for a transmission job. Thereafter, both the copy application section 4020 and the sending application section 4021 issue a request to the network application section 4120 to send a file stored on the HDD 2004.

In response to the request, the network application section 4120 transmits the stored file. When the job is started, the network application section 4120 receives setting information regarding copying from the copy application section 4020 and transmits the setting information to a remote system. For remote copying, the network application section 4120 uses a communication protocol that is unique to the system to transmit the setting information. For a transmission job, the network application section 4120 uses a standard file-transfer protocol, such as the FTP or SMB protocol.

For facsimile transmission, after a file is stored, the sending application section 4021 issues a transmission request to a facsimile (FAX) manager 4041 via the common interface 4030 and the job manager 4040. The FAX manager 4041 negotiates with the receiving end system via modem 2050. The FAX manager 4041 then issues a request for necessary image processing (e.g., conversion from a color image into a black-and-white image, conversion from a multivalued image into a binary image, rotation, and zooming) to the image manager 4110 and transmits a converted image to the system at the receiving end.

When there is a printer at a receiving end, the sending application section 4021 issues a print instruction, which acts as a print job. An operation for issuing the print instruction is performed in the same manner as for a remote-copy print job described below. When a box address in the system is specified as a destination, the file storage manager 4100 stores a corresponding file on the system.

On the other hand, for fax reception, the FAX manager 4041 receives an image via the modem 2050 and stores it as an image file on the HDD 2004. After storing, the FAX manager 4041 issues a notification to the box application section 4022. In turn, the box application section 4022 issues a reception-print instruction to the job manager 4040 via the common interface 4030. Since the subsequent operation is analogous to an operation for a typical box print job, the description thereof is omitted.

Next, software processing for remote-copy print jobs is described.

In this case, the network application section 4120 stores an image, sent from a transmitting end, on the HDD 2004 and also issues a job instruction to the copy application section 4020. The copy application section 4020, in turn, subjects a print job to the job manager 4040 via the common interface 4030. Unlike the local copying, the file load manager 4060 (as opposed to the scan manger 4050) receives the print job from the job manager 4040. In response, the file load manager 4060 issues, to the image manager 4110 via the synchronization manager 4080, a request for loading the received image into the memory from the HDD 2004.

The image manager 4110 then loads the image into the memory. Upon completion of the loading, the image manager 4110 sends a load completion notification to the file load manager 4060 and the print manager 4090 via the synchronization manager 4080. The job manager 4040 also issues an instruction for specifying a paper-feed stage to the printer unit 2095 via the device interface, and when the image is loaded into the memory, the print manager 4090 selects the specified paper-feed stage or a stage having a paper size corresponding thereto and issues a print request. For automatic paper selection, the print manager 4090 determines a paper-feed stage based on the size of the image and issues a print request.

Then, the print manager 4090 issues a print-image processing request to the synchronization manager 4080. In response, the synchronization manager 4080 issues a setting request for image processing to the image manager 4110. For example, when an optimum paper size runs out so that image rotation is necessary, a rotation instruction is directed to the image manager 4110, which uses the rotation section 2019 to rotate the image.

In addition, the image manager 4110 performs setting for the printer-image processor 2016 and sends a print-preparation completion notification to the print manager 4090 via the synchronization manager 4080. The printer manager 4090 then issues a print instruction to the printer unit 2095. A print-image transfer completion notification is sent to the image manager 4110 via a hardware interrupt signal. In response, the synchronization manager 4080 transfers the print completion notification to the file load manager 4060 and the print manager 4090. The file load manager 4060 then returns a completion notification to the job manager 4040.

In response to a paper-discharge completion notification from the printer unit 2095, the print manager 4090 returns a completion notification to the job manager 4040. In turn, the job manager 4040 transfers the completion notification to the copy application section 4020 via the common interface 4030. After scanning and printing are completed, the copy application section 4020 then issues a job-completion notification to the UI control section 4010.

Next, software processing for job loading and storing of PDL data is described.

In this case, a request transmitted from a host computer that has input a PDL print is sent to the PDL application section 4023 via the network application section 4102. The PDL application section 4023 then issues an instruction for PDL data loading/storing to the job manager 4040 via the common interface 4030. Subsequently, the PDL manager 4070 (and the file storage manager 4100) receives the instruction from the job manager 4040. Image-input processing after completion of raster-image processing is analogous to the processing for the above-described scan job.

Thereafter, an image in the memory is transferred and stored onto the HDD 2004 in conjunction with the text/photo determination signal. In this case, information associated with the image is stored in SRAM (not shown). The associated information includes color/B&W information, PDL image information, color space (CMYK or RGB) information. After the PDL image is stored on the HDD 2004, the job manager 4040 receives a storage completion notification from the synchronization manager 4080 and transfers the storage completion notification to the PDL application section 4023 via the common interface 4030. In response to the notification, the PDL application section 4023 transfers the storage completion notification, which indicates that the image has been stored on the HDD 2004, to the network application section 4120. The storage completion notification is further transmitted to the host computer that has input the PDL print. For a PDL print job, the PDL manager 4070 and the print manager 4090 cooperate with each other to print an image loaded into the memory.

For printing of an image expanded into PDL and thereafter stored, a stored document specified by the UI control section 4010 is issued as a print job to the box application section 4022. The box application section 4022, in turn, sends the print job to the job manager 4040 via the common interface 4030. Unlike processing for local copying, the file load manager 4060 (as opposed to scan manger 4050) receives the print job from the job manager 4040. The file load manager 4060 then issues, to the image manager 4110 via the synchronization manager 4080, a request for loading the image specified for printing into the memory from the HDD 2004. After the specified image is loaded, operations then proceed in a similar manner as described for the remote-copy print jobs, discussed above.

Figure 15:
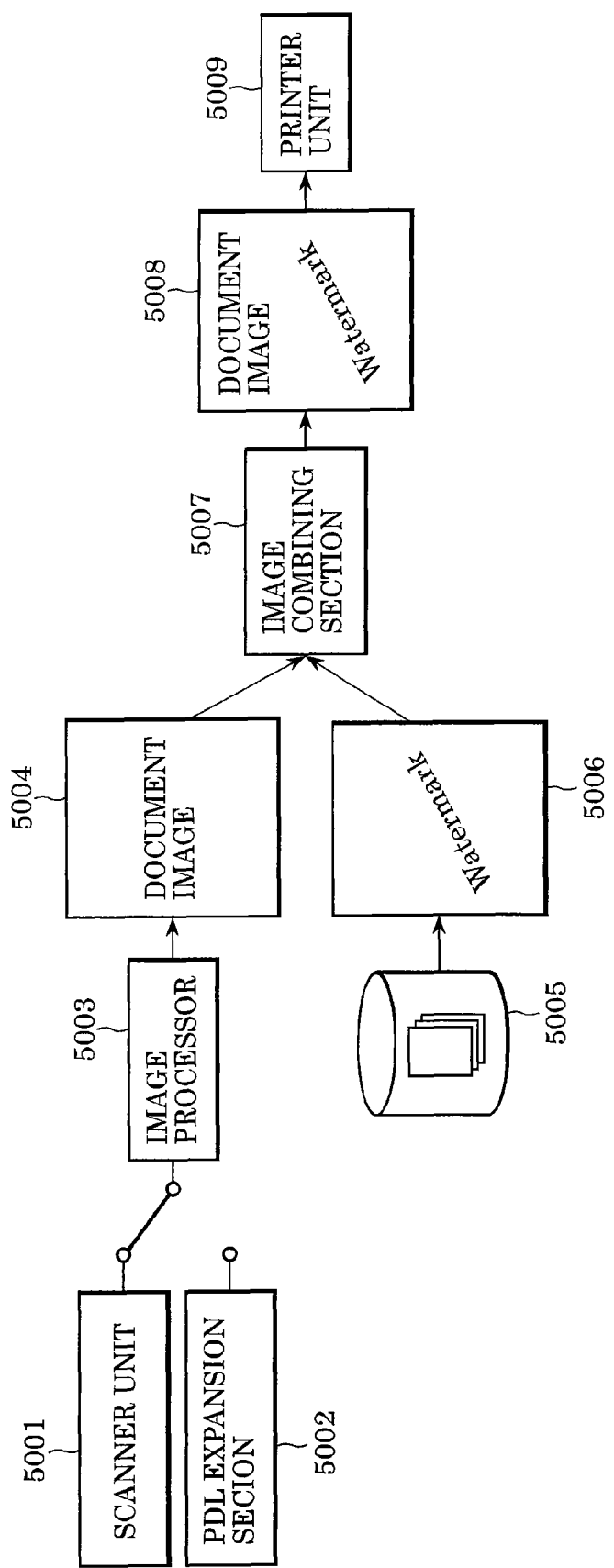
FIG. 15 is a block diagram of the configuration of the image processing system for performing processing for combining images in accordance with an embodiment of the present invention.

FIG. 15 is a block diagram showing the configuration of the image processing system for performing processing for combining images according to the first embodiment of the present invention. As shown in FIG. 15, an image is output from a scanner unit 5001 or a PDL expansion section 5002 and is then selectively input to an input-image processor 5003, in which the input image is subjected to known input-image processing. This processing involves automatic color/B&W determination processing, which automatically determines whether the input image is a color image or a black-and-white image. The resulting document image 5004, which has been subjected to the input-image processing, is then stored in an image memory. Further, a watermark image 5006 to be combined with the document image 5004 is stored on a hard disk 5005 and is loaded into the memory for combination processing. An image combining section 5007 combines the watermark image 5006 with the document image 5004 and outputs a composite image 5008 to a printer unit 5009.

FIG. 16 is a flow chart of a process for combining images according to the first embodiment of the present invention. The image combination processing shown in FIG. 16 is an example of combination of a scanned image and an image pre-stored on hard disk.

First, in step S5000, the user operates the operation unit 2006 to perform setting for combining images and then presses the copy start key 2803 to initiate the process. Next, in step S5001, a document image is scanned, and then stored in the memory. At this point, input-image processing is performed for counting the number of color pixels in the scanned image. In step S5002, based on the number of color pixels counted in step S5001, a determination is made as to whether the document image is a color image or black-and-white image, so that a color mode for the scanned image is determined.

In step S5011, an image to be combined with the scanned image is loaded from the hard disk into the memory. During loading, in step S5012, a color mode that corresponds to and that is stored with the image to be combined is selected, and the color mode for the image to be combined is determined. In this case, the color mode for the image to be combined can be a predetermined color mode or a predetermined B&W mode, or can be a color mode or a B&W mode that is automatically determined as described above. These exemplary four types of color mode for an image to be combined are stored on the hard disk. Thus, an image to be combined is generated in advance, a color mode for the image is set or determined, and the set or determined color mode is stored on the hard disk.

In step S5003, when a color mode for the scanned image and a color mode for the image to be combined are both determined, the color mode for the composite image is determined. In step S5004, processing is performed to combine the scanned image and the image to be combined. Thereafter, in step S5005, color-space conversion processing is performed to convert the color space of the output composite image into a color space corresponding to the composite-image color mode determined in step S5003. In step S5006, the resulting image, which has been subjected to the color-space conversion processing, is printed out. In step S5007, the composite-copy processing ends.

FIG. 17 is a table showing color modes for a composite image when a composite-color-mode priority setting unit of the first embodiment gives priority to an input image. In this embodiment, as shown in FIG. 17, where priority is given to an input image (i.e., a scanned image), and when "color" is selected for a color mode for a document image, the color mode for a composite image is set to "color", which is the color mode for the document image, regardless of the color mode for the image to be combined. In contrast, when "black and white (B&W)" is selected for the color mode for the document image, the color mode for the composite image is set to "black and white", regardless of the color mode for the image to be combined.

When automatic color selection (ACS) is selected for the color mode for the document image, the color mode for the composite image is selected based on whether the document image is a color or B&W. Thus, when it is determined that the document image is in color, the color mode for the composite image is automatically set to "color", regardless of the color mode for the image to be combined. On the other hand, when it is determined that the document image is in black and white, the color mode for the composite image is automatically set to "black and white", regardless of the color mode for the image to be combined.

FIG. 18 is a table showing color modes for a composite image when the composite-color-mode priority setting unit in the first embodiment gives priority to an image to be combined. As shown in FIG. 18, where priority is given to an image to be combined, and when "color" is selected for at least the color mode for the document image or the color mode for the image to be combined or when ACS determines that the color mode is "color", the color mode for the composite image is set to "color" which is the color mode for the image to be combined. In contrast, when "black and white" is selected for both the color mode for the document image and the color mode for the image to be combined or when the automatic color selection (ACS) determines that the color mode is "black and white", the color mode for the composite image is set to "white and black".

Second Embodiment

In the second embodiment, an example of color modes that are different from the composite-image color modes set when the composite-color-mode priority setting unit of the first embodiment gives priority to an image to be combined. FIG. 19 is a table showing color modes for the composite image when composite-color-mode priority setting unit of the second embodiment gives priority to an image to be combined.

In the second embodiment, even when "color" is selected (or automatically determined by ACS) for the color mode for a document image and the color mode for an image to be combined is determined (either automatically by ACS or otherwise) to be "black and white", the color mode for the composite image is set to "black and white".

With the above-described color modes for a composite image, the user can output a black-and-white composite image when the source image is black and white even when the pre-stored images (e.g., watermark image) are in color.

Other Embodiments

The present invention may be applied to a system implemented by a plurality of pieces of equipment (e.g., a host computer, interface device, reader, and printer) or may be applied to a single system (e.g., a copier or facsimile machine) implemented by one piece of equipment.

The present invention can also be achieved by supplying a storage medium (or recording medium), in which software program code that accomplishes the functions of the illustrated embodiments is stored, to a system that a computer (or CPU or MPU) of the system or system reads and executes the program code stored in the storage medium. In such a case, the program code that is read from the storage medium achieves the features of the embodiments described above and the storage medium in which the program code is recorded is also encompassed by the present invention. Further, not only is the program code that is read from the computer executed to achieve the features of the illustrated embodiments, but also an operating system (OS) or the like that is running on the computer may perform part or all of the actual processing in accordance with an instruction of the program code to achieve the features of the illustrated embodiments. Such an arrangement is also covered by the present invention.

Additionally, after the program code read from the storage medium is stored in a memory that is provided in a plug-in card inserted into the computer or an expansion unit connected to the computer, a CPU or the like that is provided in the plug-in card or the expansion unit may perform part or all of the actual processing in accordance with an instruction of the program code to achieve the features of the illustrated embodiment. Such an arrangement is also encompassed by the present invention.

When the present invention is applied to the above-noted storage medium, the storage medium stores program code corresponding to the flow chart discussed above.

An advantage of the present invention is that composite images corresponding to a desired output mode can be output as intended by a user. In addition, the composite image can be output in the desired output mode by using a composite-color-mode priority setting system to provide the desired output mode with priority.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus comprising:
a scanning unit configured to scan an image on a document to obtain image data;
a combining unit configured to combine the obtained image data and other image data to produce combined image data; and
a printing unit configured to print, when a first mode is set, black-and-white combined image data regardless of the color of the other image data when the color of the obtained image data is black-and-white, and to print, when a second mode is set, color combined image data regardless of the color of the obtained image data when the color of the other image data is color.

2. A method comprising:
scanning an image on a document to obtain image data;
combining the obtained image data and other image data to produce combined image data;
printing, when a first mode is set, black-and-white combined image data regardless of the color of the other image data when the color of the obtained image data is black-and-white; and
printing, when a second mode is set, color combined image data regardless of the color of the obtained image data when the color of the other image data is color.

3. A computer-readable storage medium having stored thereon computer-executable instructions for performing a printing method, the printing method comprising:
scanning an image on a document to obtain image data;
combining the obtained image data and other image data to produce combined image data;
printing, when a first mode is set, black-and-white combined image data regardless of the color of the other image data when the color of the obtained image data is black-and-white; and
printing, when a second mode is set, color combined image data regardless of the color of the obtained image data when the color of the other image data is color.

4. The apparatus according to claim 1,
wherein the printing unit is further configured to,
when the first mode is set and the color of the obtained image data is color, print color combined image data regardless of the color of the other image data, and
when the second mode is set and the color of the other image data is black-and-white, print color combined image data when the color of the obtained image data is color, and print black-and-white combined image data when the color of the obtained image data is black-and-white.

5. The method according to claim 2, further comprising:
printing, when the first mode is set, color combined image data regardless of the color of the other image data when the color of the obtained image data is color;
printing, when the second mode is set, color combined image data when the color of the obtained image data is color and the color of the other image data is black-and-white; and
printing, when the second mode is set, black-and-white combined image data when the color of the obtained image data is black-and-white and the color of the other image data is black-and-white.

6. The computer-readable storage medium according to claim 3, wherein the printing method further comprises:

printing, when the first mode is set, color combined image data regardless of the color of the other image data when the color of the obtained image data is color;

printing, when the second mode is set, color combined image data when the color of the obtained image data is color and the color of the other image data is black-and-white; and printing, when the second mode is set, black-and-white combined image data when the color of the obtained image data is black-and-white and the color of the other image data is black-and-white.

7. An apparatus comprising:

an inputting unit configured to input image data;

a combining unit configured to combine the input image data and other image data to produce combined image data; and a printing unit configured to print, when a first mode is set, "black-and-white" combined image data regardless of information stored for the other image data when information stored for the input image data represents "black-and-white", and to print, when a second mode is set, "color" combined image data regardless of the information stored for the input image data when the information stored for the other image data represents "color".

* * * * *